US009431672B2

(12) United States Patent
Datta et al.

(10) Patent No.: US 9,431,672 B2
(45) Date of Patent: Aug. 30, 2016

(54) MOLTEN-SALT ELECTROLYTE UNITIZED REGENERATIVE HYDROGEN-HALOGEN FUEL CELL WITH ANION TRANSFER

(71) Applicants: Ravindra Datta, Worcester, MA (US); Drew J. Martino, Red Hook, NY (US)

(72) Inventors: Ravindra Datta, Worcester, MA (US); Drew J. Martino, Red Hook, NY (US)

(73) Assignee: Worcester Polytechnic Institute, Worcester, MA (US)

( * ) Notice: Subject to any disclaimer, the term of this patent is extended or adjusted under 35 U.S.C. 154(b) by 165 days.

(21) Appl. No.: 13/894,599

(22) Filed: May 15, 2013

(65) Prior Publication Data
US 2013/0309592 A1  Nov. 21, 2013

Related U.S. Application Data

(60) Provisional application No. 61/647,672, filed on May 16, 2012.

(51) Int. Cl.
*H01M 8/18* (2006.01)
*H01M 8/20* (2006.01)
*H01M 8/22* (2006.01)
*H01M 8/14* (2006.01)

(52) U.S. Cl.
CPC ............... *H01M 8/22* (2013.01); *H01M 8/14* (2013.01); *H01M 8/144* (2013.01); *H01M 8/186* (2013.01); *H01M 8/20* (2013.01); *Y02E 60/528* (2013.01)

(58) Field of Classification Search
CPC .................................................. H01M 8/188
See application file for complete search history.

(56) References Cited

U.S. PATENT DOCUMENTS

| 4,898,845 | A | 2/1990 | Datta et al. | |
|---|---|---|---|---|
| 8,080,327 | B1* | 12/2011 | Rasmussen | H01M 4/60 429/101 |
| 2013/0084474 | A1* | 4/2013 | Mills | H01M 4/9016 429/9 |
| 2013/0084482 | A1* | 4/2013 | Chang | H01M 10/4242 429/107 |
| 2013/0084506 | A1* | 4/2013 | Chang | H01M 8/188 429/400 |
| 2014/0072836 | A1* | 3/2014 | Mills | C25B 1/04 429/8 |

OTHER PUBLICATIONS

Wauters, et al., "Electrolytic Membrane Recovery of Bromine from Waste Hydrogen Bromide Streams", AIChEJ., vol. 44, 2144-2148, Oct. 1998.
Park, et al., "Electrolysis of HBr using molten, alkali-bromide electrolytes", Electrochimica Acta 56, 1581-1584, (2011).

* cited by examiner

Primary Examiner — Ula C Ruddock
Assistant Examiner — Scott J Chmielecki
(74) Attorney, Agent, or Firm — Chapin Intellectual Property Law, LLC (57) ABSTRACT

A unitized regenerative fuel cell (URFC) employs a molten salt electrolyte for negative ion transfer by operating at temperatures above that of aqueous reactants for supporting gas-phase reactants, and the molten salt mitigates the need for reactant based catalysts by serving the dual role of the electrolyte as well as an optional catalyst or catalyst solvent. The molten-salt electrolyte (MSE) hydrogen-halogen unitized regenerative fuel cell is adaptable for microgrid electricity storage applications. Configurations herein employ a molten-salt electrolyte and a closed system of the reactants for cycling between charge and discharge modes. The URFC employs reactants including hydrogen and halogen as the oxidant, which is more reactive and energy efficient than oxygen employed in conventional URFCs, and avoids platinum electrodes by employing a high temperature, gas-phase, system which further reduces reactant crossover issues.

8 Claims, 7 Drawing Sheets

MOLTEN-SALT ELECTROLYTE UNITIZED REGENERATIVE HYDROGEN-HALOGEN FUEL CELL WITH ANION TRANSFER

RELATED APPLICATIONS

This patent application claims the benefit under 35 U.S.C. §119(e) of U.S. Provisional Patent App. No. 61/647,672, filed May 16, 2012, entitled "Hydrogen-Bromine Supported Molten-Salt Electrocatalytic (SMSEC) Unitized Regenerative Fuel Cell (URFC) for Electrical Energy Storage" incorporated herein by reference in entirety.

BACKGROUND

For renewable electric power generated by wind or solar farms to make inroads into the US electric utility market, new technologies for electrical energy storage (EES) are needed that are efficient, cost effective, fast, reliable, scalable, and broadly deployable. The EES storage technologies can generally be classified into: 1) direct storage of electrons, e.g., in supercapacitors, 2) conversion of electric energy into mechanical energy, e.g., kinetic energy in flywheels or into potential energy in pumped hydropower, which currently accounts for 99% of the world-wide installed EES capacity, or compressed air energy storage (CAES), and 3) conversion of electric energy into chemical energy, e.g., in batteries, flow batteries, or unitized regenerative fuel cells (URFCs). The direct storage of electrons in supercapacitors is suitable only for short bursts for power management, while pumped hydropower and CAES are highly site specific.

Regenerative fuel cells, such as URFCs, circulate material in the form of a fluid for reacting the charge material in a cell to generate electricity from an electrochemical reaction between anode and cathode charge materials. In contrast to conventional fuel cells such as commonly employed in automobiles, portable electronics, and flashlights, URFCs do not need continuous feed of the anode and cathode materials to perform. Rather, they produce these materials in the same device when excess electricity is available and store them to use when electric production is needed. Thus, unitized regenerative fuel cells have the added property that the electrochemical reaction is reversible to return the products of power generation to an original state. In other words, like batteries, URFCs are electric power storage devices, with the key difference that the reactant storage units are distinct from the electrochemical cell.

The variable and intermittent nature of renewable electric power from solar or wind sources calls for the development of cost-effective, modular, grid-scale, electric power storage systems that are broadly deployable and geographically independent. Electrochemical energy storage, including batteries and regenerative fuel cells, is of the foremost interest in this regard, including: 1) secondary batteries, i.e., the sodium-sulfur battery, the lead-acid battery, the Ni—Cd battery; 2) flow batteries such as the vanadium redox battery and the zinc bromine battery; and 3) regenerative $H_2$—$O_2$ proton-exchange membrane (PEM) fuel cell. However, none of these yet approach the cost and cycle life of, for example, pumped hydropower at <$100/kWh and >5000 cycles, which is a key industry target.

SUMMARY

The hydrogen-halogen unitized regenerative fuel cell employs a molten salt or ionic liquid electrolyte for negative ion (anion) transfer by operating at temperatures above that of aqueous electrolytes for supporting gas-phase reactions that mitigate the need for expensive supported solid catalysts by serving the dual role of the electrolyte as well as an optional catalyst or catalyst solvent. The molten-salt electrolyte (MSE) hydrogen-halogen unitized regenerative fuel cell is adaptable for microgrid or other electricity storage applications. Configurations herein employ a molten-salt electrolyte and a closed system of the reactants for cycling between charge and discharge modes. The URFC employs reactants including hydrogen as the fuel and a halogen such as bromine ($Br_2$) or chlorine ($Cl_2$) as the oxidant, which is far more reactive and energy efficient than oxygen employed in conventional hydrogen-oxygen ($H_2$—$O_2$) URFCs, and avoids platinum electrodes by employing a high temperature, gas-phase, system which further reduces reactant crossover issues in low-temperature systems that reduce system efficiency.

Electrochemical energy storage is appealing for broadly deployable, microgrid applications such as in wind or solar farms, which are inherently cyclic in power generation, in which the cycle may not always correspond to the cycle of power consumption, which peaks at night for solar cells. However, electrochemical energy storage is appealing in principle but elusive in practice. Secondary and flow batteries tend to be bulky and/or expensive, while the $H_2$—$O_2$ proton-exchange membrane (PEM)-unitized (reversible) regenerative fuel cell (URFC) is expensive because of the use of platinum and Nafion®, fragile, and inefficient because of low temperature oxidation coupled with the sluggish oxygen electrode reaction (OER). To overcome the inefficiency of OER, hydrogen halogen URFCs have been proposed, wherein the oxygen is replaced by a more reactive halogen, e.g., chlorine ($Cl_2$) or bromine ($Br_2$). These systems, however, are low-temperature, aqueous-phase systems that are also expensive because of the use of platinum and Nafion®, and furthermore have serious crossover issues that reduce Faradaic efficiencies. So, while the hydrogen-halogen systems have been investigated for over three decades, they are not yet practical. Conventional batteries such as lead-acid battery have been employed in some applications. Flow batteries, such as zinc-bromine battery, are also promising and some of these are at the demonstration stage.

In the examples shown below, an electrochemical device such as a fuel cell employs a reactant cell including a separator between a plurality of chambers, such that each chamber corresponds to a respective side of the separator. In the example fuel cell, at least two chambers are bifurcated by the separator, and multiple chambers may be aggregated, or stacked to achieve a desired power output. The chambers define a containment including a fluidic coupling for a first energy component, and a fluidic coupling for a second energy component, such that the first and second energy components are adapted for ionic transfer. An electrode on each side of the separator provides for electrical transfer from the energy component in the corresponding chamber, in which the separator is based on molten salts or ionic liquids adapted for negative ion, or anion, transfer. The ionic liquid (IL) generally refers to a salt in the liquid state, and includes alternate characterizations such as liquid electrolytes, ionic melts, ionic fluids, fused salts, liquid salts, or ionic glasses. The designation "molten salt" as employed herein should be taken to include liquids comprising ions and short-lived ion pairs, suitable for facilitating negative ion transfer through the separator. Alternatively, a homogeneous catalyst, when needed, comprising of ionic species dissolved within the molten salt electrolyte, may also be employed.

The example configuration discussed below discloses the URFC for electrochemical energy storage, including a hydrogen-halogen regenerative fuel cell invoking low activation overpotentials employing high temperature gas-phase chemistry, such that the fuel cell defines a closed system of reactants for cycling between charge and discharge modes. The fuel cell employs a molten salt electrolyte, a homogenous catalyst solvated within the molten-salt electrolyte, and a thin porous ceramic or polymer separator with the supported molten-salt electrolyte. A reductant and oxidant are from opposed sides of the periodic table such that kinetics of both electrodes are facilitated. The molten salt or ionic liquid may further comprise halide anions, and the temperature employed is typically, but not exclusively, in the range of 150-400° C. such that reacting components are in the gas-phase for limiting crossover and efficiency losses.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Regenerative fuel cells decouple power and energy because the charge material (reactants) is maintained separately and may be stored as an arbitrary volume, depending on need, in contrast to conventional secondary batteries which have a fixed quantity of charge material. Therefore, the charge volume, or capacity, is independent from the energy density, or delivery rate of electrical energy (current and voltage) being drawn from the fuel cell. URFCs, and flow batteries, are inherently superior to secondary batteries, e.g., lead-acid or Li-ion, since the power unit is separate from the energy storage sub-system. Thus, the fuel cell size is determined by the power requirements during charging and discharging, while the fuel/oxidant storage system size is determined by the energy requirements, i.e., the duration of the charge/discharge cycle. Further, energy storage subsystem cost is small compared with the cost of the fuel cell, as it merely requires vessels for containment and flow of the reactants to the fuel cell.

Figure 1A:
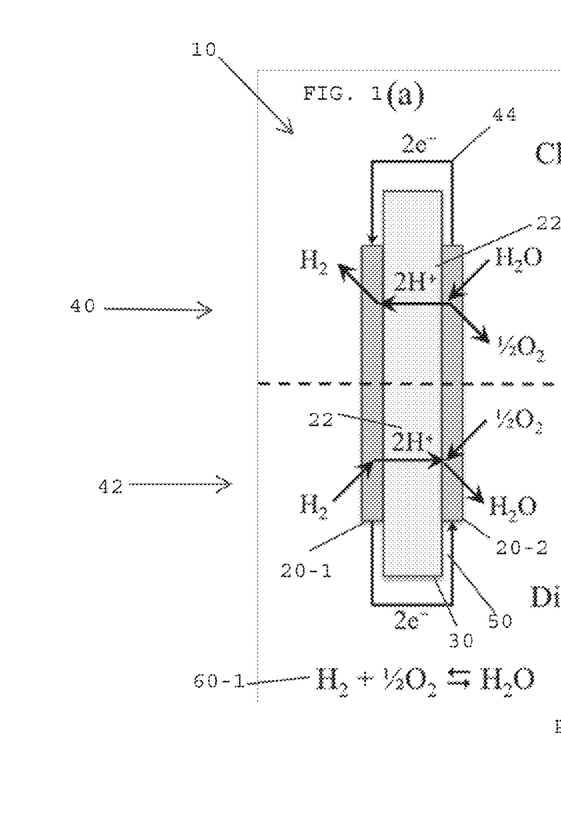
FIGS. 1a and 1b show prior art regenerative fuel cells with proton transfer.
Figure 1B:
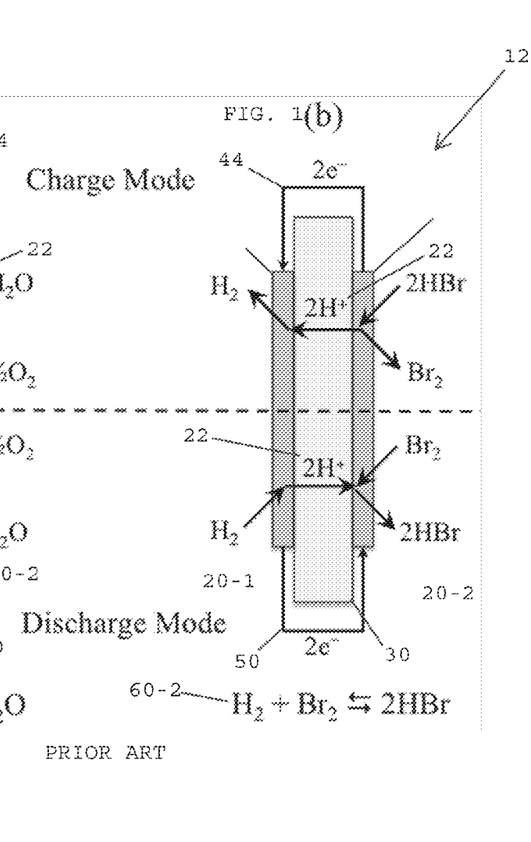

FIGS. 1a and 1b are prior art regenerative fuel cells. Referring to FIG. 1a, a conventional hydrogen-oxygen based regenerative fuel cell 10 is shown. Referring also to FIG. 1b, a conventional hydrogen-halogen based regenerative fuel cell 12 is shown. In both arrangements, a pair of electrodes 20-1, 20-2 (20 generally) flanks an electrolyte containing barrier 30 such as a proton exchange membrane (PEM), adapted for transfer of positive ions, protons 22. A charge mode 40 receives electrical energy (current) from application of a voltage potential across the electrodes 20-1, 20-2, stripping a hydrogen ion 22 from water (FIG. 1a) or hydrogen bromide (FIG. 1b) for transfer across the conventional barrier 30, driven by the electron flow 44 across the electrodes 20-1, 20-2, shown by overall reactions 60-1 for hydrogen/oxygen and 60-2 for hydrogen/bromine. A discharge mode 42 generates a voltage potential for powering electrical loads by introducing hydrogen 46 for producing hydrogen ion (proton) 22 that transfers across the barrier 30, resulting in an electron flow 50. The protons arrive at the other electrode and react with the oxidant ($O_2$ for the hydrogen-oxygen fuel cell and $Br_2$ for the hydrogen-halogen fuel cell) to produce the product shown in overall reactions 60-1 or 60-2, which is stored for use in the charge mode.

The conventional $H_2$—$O_2$ URFC, thus, combines a PEM fuel cell and a PEM water electrolyzer (WE) within the same unit, which works as a WE to produce $H_2$ and $O_2$ when electricity is available (charge mode), and as a FC to produce electricity as needed from the stored $H_2$ and $O_2$ (discharge mode) (FIG. 1a). The advantages are high specific energy (up to 450 Wh/kg) as compared to flow batteries (50-125 Wh/kg), and long-term energy storage, since, unlike in batteries, there is little self-discharge, and good cycle life. However, cost is high because of expensive materials, i.e., Pt-based catalysts and Nafion® electrolyte, and cycle efficiencies are low (~40%). In the typical URFC, Nafion® 117 is used as the PEM, and Pt black is used at the $H_2$ electrode, which functions well for both the $H_2$ oxidation reaction (HOR) during the FC mode, and for the $H_2$ evolution reaction during the WE mode. However, most of the polarization and efficiency loss occurs at the conventional $O_2$ electrode 20-2, which typically uses a 50-50 mixture of Pt and Ir black.

To avoid low efficiency of the ORR in URFCs, other chemistries have been proposed. Thus, hydrogen-halogen regenerative fuel cell systems represent the best hope. This is so because the reductant and the oxidant are from the opposite ends of the periodic table, so that the kinetics of both electrodes are rapid. This not only means that the overpotentials, or potential losses, are very small, but also that expensive electrocatalysts may not be needed if the temperature of operation could be increased, which is not possible in conventional hydrogen-halogen URFCs because of the use of Nafion®, which requires liquid water for proton transport. A particular shortcoming in conventional $H_2$—$Br_2$ system of FIG. 1b, further, is the significant solubility and, hence, crossover of bromine, thus providing low Faradaic efficiencies and/or permitting only low concentrations of liquid bromine solution that can be used.

The conventional low-temperature aqueous-phase $H_2$—$Br_2$ regenerative fuel cell system is shown in FIG. 1b, and represented by equation 60-2. The aqueous hydrobromic acid solution is electrolyzed during the charging mode 40 to generate $Br_2$, protons 22, and electrons at electrode 20-2. The protons 22 then go through the barrier 30, which in this case is a proton-exchange membrane (PEM), and electrons flow 44 via the outer circuit, arriving at the opposite electrode 20-1 and combining there to form $H_2$. The hence generated $H_2$ and $Br_2$ are stored separately, the latter remaining solubilized in HBr, while the former is pressurized. In the discharge mode, the stored $H_2$ and $Br_2$ are reacted at the respective electrodes in a fuel cell reaction to produce electricity, along with HBr.

To overcome the issues related to such low-temperature liquid-phase URFCs or flow batteries, a high-temperature gas-phase hydrogen-halogen URFC is based on a supported molten salt or ionic liquid electrolyte forming a separator for negative ion transfer (rather than positive ion transfer in the barrier 30 in conventional URFCs), higher temperatures not available with aqueous based systems, and can avoid electrode catalysts altogether. Alternatively, catalysts employed may be relatively inexpensive at the higher operating temperature, or may be employed as dissolved within the molten salt electrolyte layer, rather than as solid materials in the two electrodes. The higher temperature of operation allowed by the use of molten-salt or ionic liquid electrolytes not only reduces electrode overpotentials but also can avoid platinum (Pt) altogether and allow using inexpensive electrocatalysts. Further, these catalysts may be dissolved with the molten-salt electrolyte. Accordingly, configurations herein employ the use of molten salts in a unitized regenerative fuel cell as proposed for serving the dual role of the electrolyte as well as a catalyst or catalyst solvent.

Figure 2:
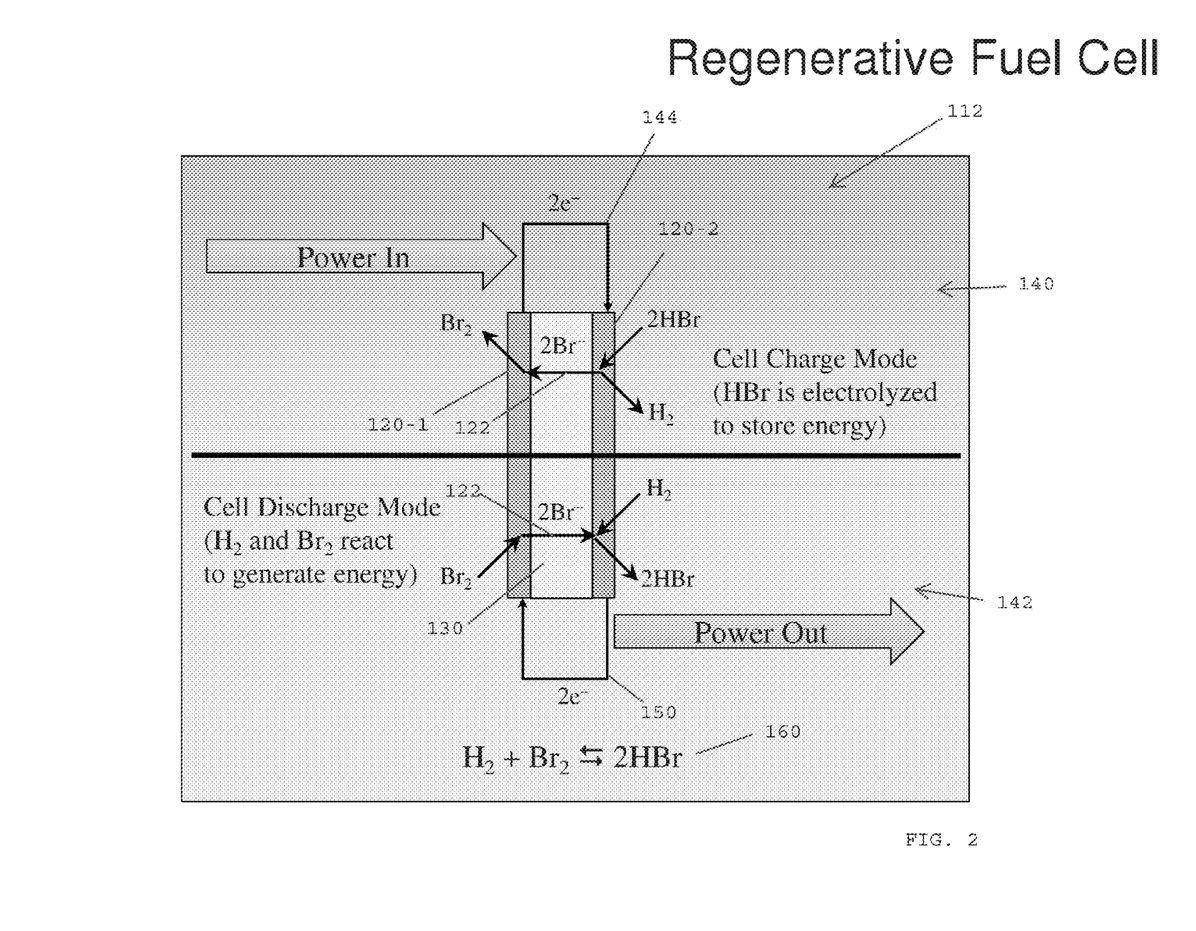
FIG. 2 is a diagram of a hydrogen-halogen ($Br_2$) regenerative fuel cell showing anion transfer as disclosed herein.

FIG. 2 is a diagram of a regenerative fuel cell as disclosed and claimed herein. Referring to FIG. 2, an example hydrogen-halogen unitized regenerative fuel cell 112 (URFC, or simply fuel cell hereinafter) is shown. The particular configuration shown employs hydrogen and bromine as reactants, however other hydrogen/halogen combinations may be employed, such as a hydrogen-chlorine cell. A pair of electrodes 120-1, 120-2 (120 generally) attach to opposed sides of a molten salt based separator 130 (separator) for providing transfer of negative ions, or anions, 122 across the separator (bromide ions, in the example shown).

The fuel cell 112 operates in a discharge mode 142, for delivering a voltage potential 150 and providing power out to a load, and a charge mode 140 which receives power from an external voltage 144, reversing the reaction of the discharge mode and returning the reactants to the "charged" state, both as shown by equation 160. The regenerative feature of the claimed approach stems from the property of efficiently returning the reactants the reactants to a previous state by repeatedly reversing the reaction as the fuel cell 112 alternates between charging and discharging.

In the examples shown herein, the first reactant is bromine, and the second reactant is hydrogen. The molten salt separator 130 is responsive to transfer of negative bromide ions (Br⁻) across the separator resulting in a potential at the electrodes. The molten salt separator 130 may be constructed from a porous ceramic or polymer substrate and impregnated with molten salt or ionic liquid in a predetermined combination, discussed further below in FIG. 7. An alternate configuration provides that the first reactant is chlorine or another halogen, while the second reactant continues to be hydrogen.

Figure 3:
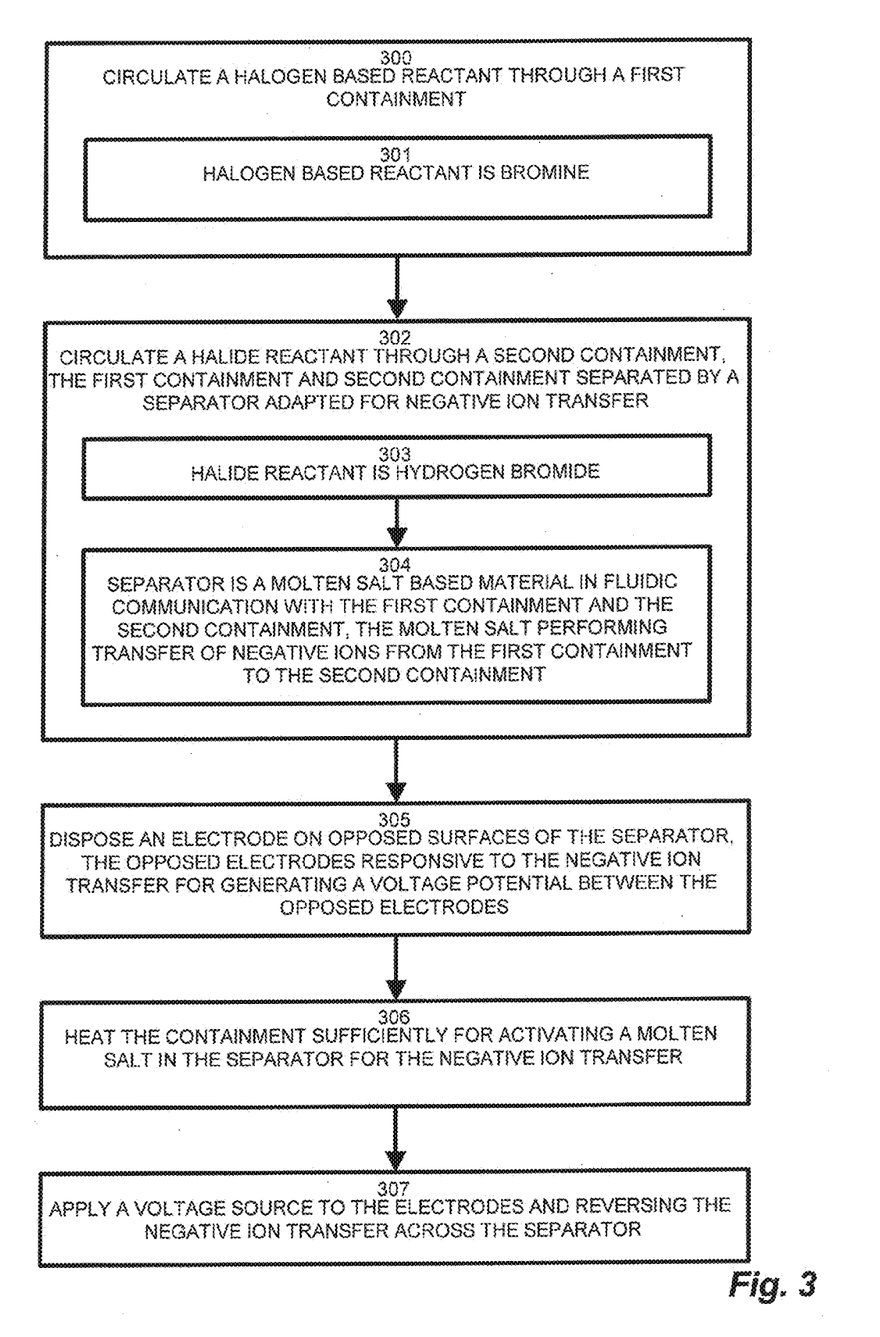
FIG. 3 is a flowchart of electrochemical generation in the fuel cell of FIG. 2

FIG. 3 is a flowchart of electrochemical generation process in the fuel cell of FIG. 2. Referring to FIGS. 2 and 3, the method for electrochemical generation in a URFC as disclosed herein includes, at step 300, circulating a halogen based reactant through a first containment. In the example arrangement, the halogen based reactant is bromine, as depicted at step 301. The fuel cell 112 circulates a halide reactant through a second containment, in which the first containment and second containment are separated by a separator 130 adapted for negative ion transfer, as depicted at step 302. In the example shown, the halide reactant is hydrogen bromide, as shown at step 303, and the separator 130 is a molten salt based material in fluidic communication with the first containment and the second containment, such that the molten salt performs transfer of negative ions from the first containment to the second containment, as disclosed at step 304.

The fuel cell 112 disposes an electrode 120 on opposed surfaces of the separator 130, such that the opposed electrodes 120 are responsive to the negative ion transfer for generating a voltage or potential 144 between the opposed electrodes 120, as depicted at step 305. The fuel cell 112 heats the containment sufficiently for melting and activating the molten salt in the separator 130 for enabling the negative ion transfer, as shown at step 306. An electrical load may then be connected across the electrodes for harvesting the electricity from the generated voltage potential. For a recharge mode, the fuel cell applies a voltage source to the electrodes 120, and reverses the negative ion transfer across the separator 130, as depicted at step 307.

Figure 4:
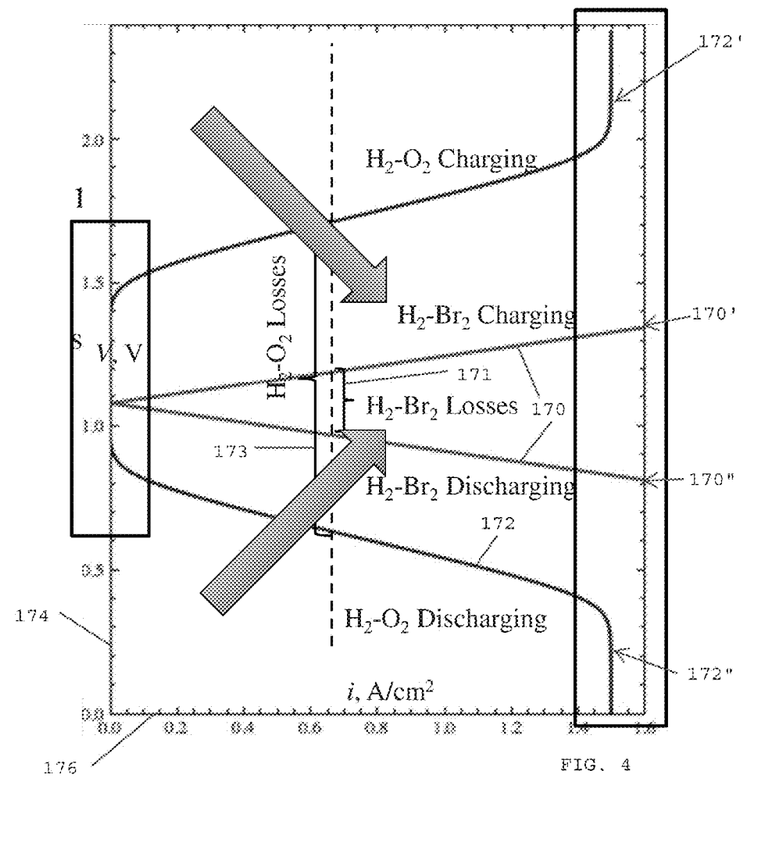
FIG. 4 shows charging efficiency in the regenerative fuel cell of FIG. 2.

FIG. 4 shows charging efficiency in the fuel cell of FIG. 2. Referring to FIGS. 2 and 4, a performance curve 170 shows the charging characteristics of the hydrogen-bromide fuel cell 112 of FIG. 2. In contrast, a hydrogen-oxygen curve 172 shows charging performance of a conventional hydrogen-oxygen fuel cell 10. A vertical axis 174 shows a charging voltage, and a horizontal axis 176 shows electrical current density. Electrical storage entities including secondary batteries, in general, require higher voltage to charge than the voltage delivered in the discharge mode. However, the difference between the charge and discharge modes indicates the charging efficiency. The charge voltage 170' required for the hydrogen-bromide fuel cell 112 is only slightly higher than the discharge voltage 170" delivered to a load, as shown by efficiency losses 171, indicating high efficiency. In contrast, the conventional hydrogen-oxygen fuel cell 10 requires substantially greater charge voltage 172' than the corresponding discharge supply voltage 172", as shown by efficiency and voltage losses 173. In fact, the efficiency of a URFC at a given current density may be calculated simply as the ratio of the discharge to the charge voltage. It is clear that the hydrogen-halogen URFC has a higher efficiency than the corresponding hydrogen-oxygen fuel cell.

Figure 5:
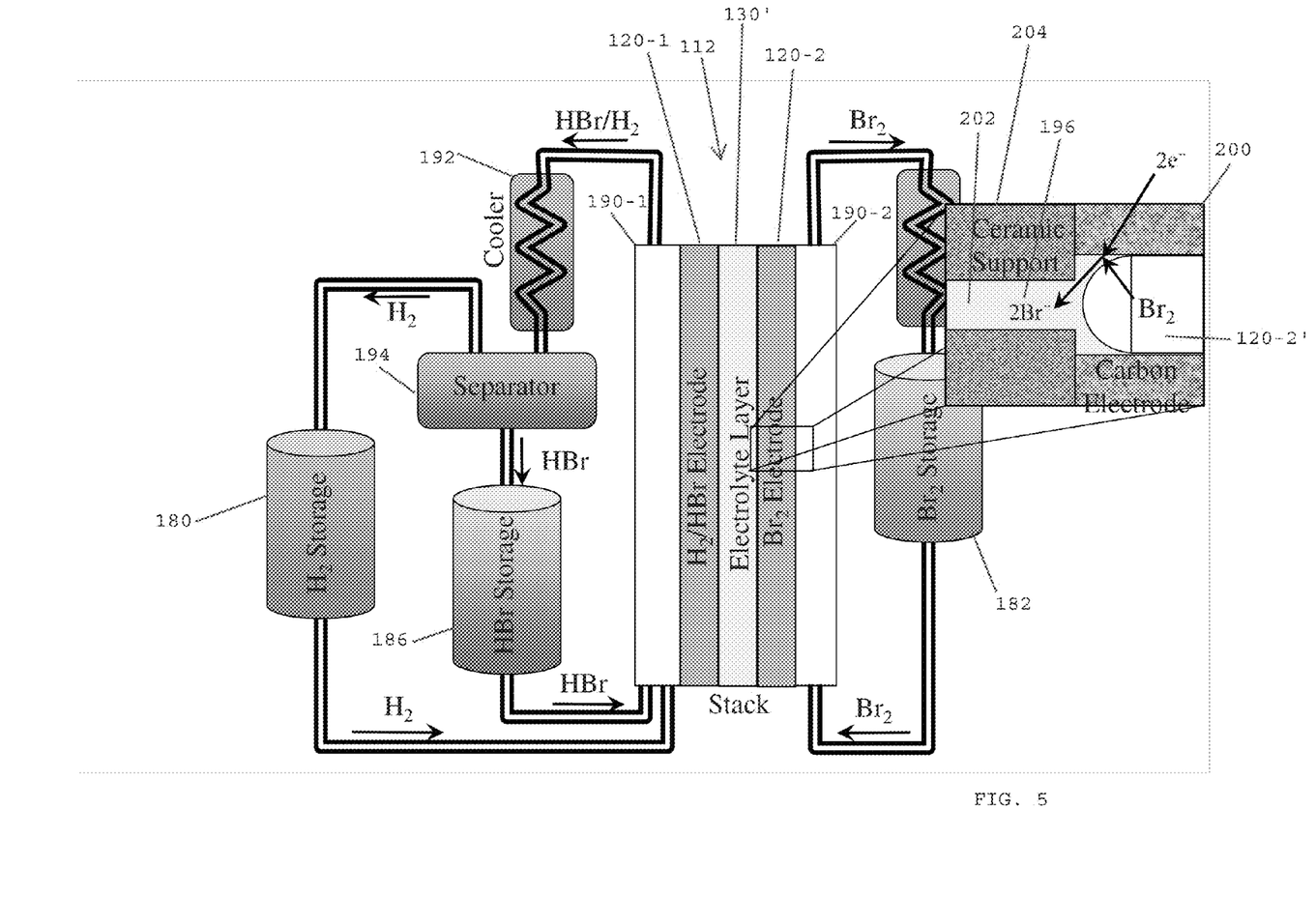
FIG. 5 shows reactant flow in the fuel cell of FIG. 2.

FIG. 5 shows reactant flow in the fuel cell of FIG. 2. Referring to FIGS. 2 and 5, the reactants, such as hydrogen 180, hydrogen bromide 186 or another halide and bromine 182 or another halogen, are stored in any suitable vessel for flowing through the fuel cell 112. The fuel cell 112 includes a hydrogen containment 190-1, and a bromine containment 190-2 (190 generally) for receiving the reactants. An electrolyte layer 130', which in the present configuration takes the form of a separator 130 impregnated with the molten salt or ionic liquid, forms a separation between the containments 190-1, 190-2. The electrodes 120-1, 120-2, for example gas-diffusion electrodes or GDL, are disposed on opposed sides of the electrolyte layer 130' and in fluidic communication with the respective reactants 180, 182 for receiving the electron flow for the charging 140 and discharging 142 modes.

Generally, the electrochemical device disclosed herein is expected to define a fuel cell 112 and the plurality of chambers are containment structures 190 including an anode chamber and a cathode chamber, such that the separator 130 defines an ionic transport layer between the anode chamber and cathode chamber for facilitating a voltage or potential between electrodes on the opposed sides of the separator 130.

In implementation, the fuel cell 112 has a stable electrode, or GDL, 120 attached to each side of the separator 120 for defining a two-phase electrochemical interface, such that the electrode is resistant to chemical degradation from the first or second energy component or electrolyte. This allows that the first and second energy components, or reactants 180, 182 may be devoid of a solid catalyst and the stable electrodes 120 to be fabricated from non-consumable, non-platinum based materials, such as graphite or carbon. The electrodes 120 are also responsive to a voltage potential for reversing the ionic transfer and restoring electrical generation properties of the first and second energy components, as in a charge/discharge cycle of operation.

In operation, the storage vessels for hydrogen bromide, or halide, 186 and gaseous hydrogen 180 are coupled to the containment 190-1 for exchanging bromide ions 122 to form hydrogen gas $H_2$ or hydrogen bromide HBr, depending on charge 140 or discharge 142 modes. A cooler 192 and hydrogen separator 194 separate and divert the gaseous hydrogen and HBr to respective storage vessels 180, 186. On the opposed side, bromide ions 196 exchange through the electrolyte layer 130' from the bromine storage 182. Exploded view 200 shows the physical communication between the electrode 120-2' and an electron path defined by the molten salt or ionic liquid 202 through a ceramic or polymer substrate 204 defining the separator 130. The molten salt or ionic liquid 202 is impregnated in the substrate 204 for providing the electrolytic properties facilitating anion transfer. The electrode 120-2 may be carbon, as Pt electrodes are not required thus avoiding catalyst ripening and consumption.

Figure 6:
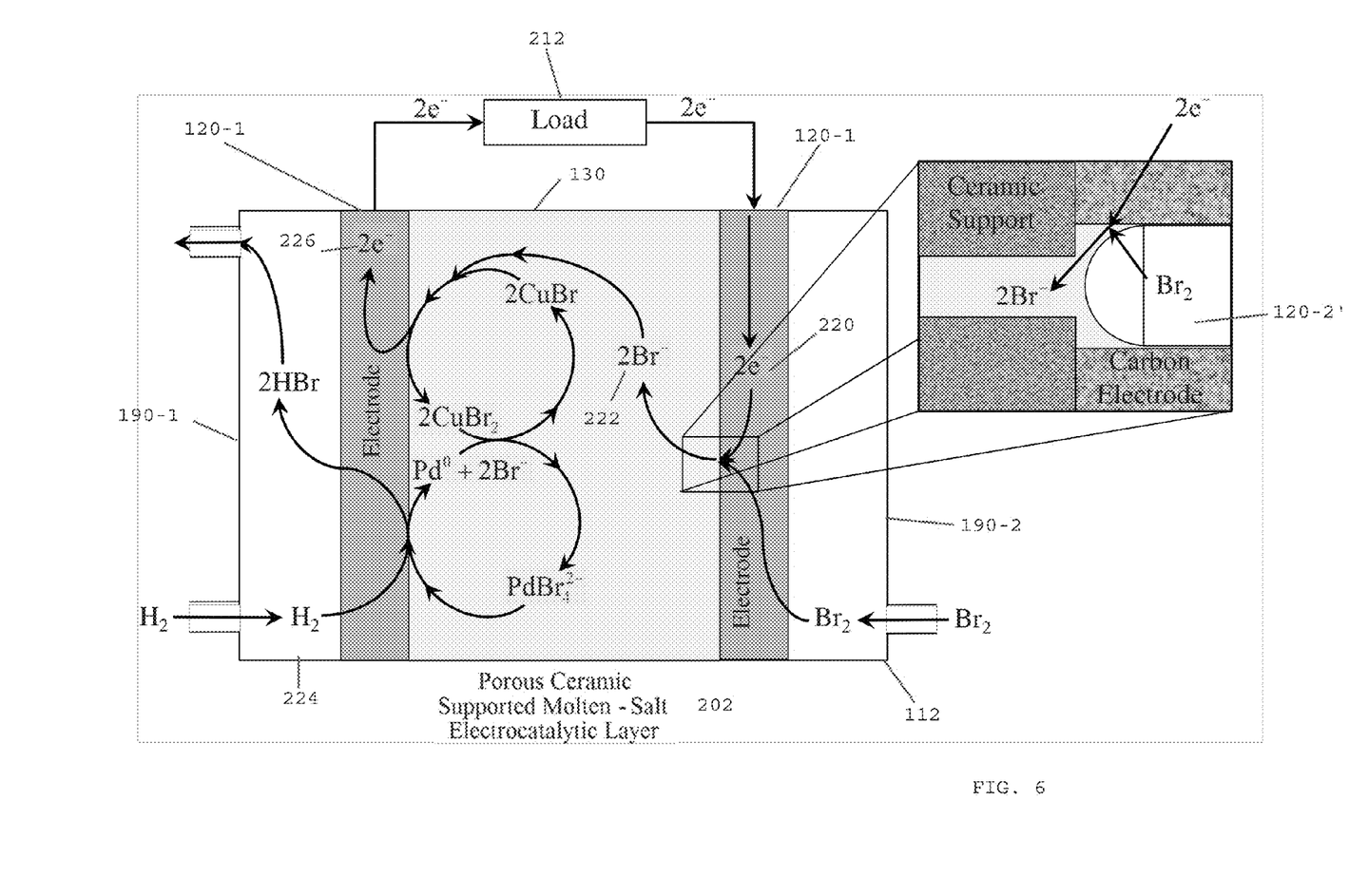
FIG. 6 shows ionic transfer and homogeneous catalysis within the electrolyte in the regenerative fuel cell of FIG. 2.

FIG. 6 shows ionic transfer as well as homogeneous catalysis in the fuel cell of FIG. 2. Referring to FIGS. 2, 5 and 6, the fuel cell 112 employs the low activation overpotentials afforded by the $H_2$-halogen chemistry, and avoids the limiting issues of the conventional low-temperature, PEM-based, aqueous-phase system, that result in crossover and, hence, a low Faradaic efficiency and catalyst poisoning and degradation. The proposed approach employs a moderate to high-temperature, gas-phase $H_2$-halogen URFC, as shown schematically in FIG. 6.

As an example of the hydrogen-halogen URFC, the chemistry of the electrodes for a $H_2$—$Br_2$ URFC for the discharge mode is shown in TABLE I:

TABLE I

| Anode: | $H_2 + 2Br^- \leftrightarrows 2HBr + 2e^-$ |
|---|---|
| Cathode: | $Br_2 (g) + 2e^- \leftrightarrows 2Br^-$ |
| Overall: | $H_2 + Br_2 \leftrightarrows 2HBr$ |

The result is a moderate to high temperature (150-400° C.), more efficient, and more durable, URFC employing substantially more reactive oxidants than $O_2$ such as halogens, $Cl_2$ or $Br_2$, As described above, the conventional $H_2$—$Cl_2$ or $H_2$—$Br_2$ URFCs are low-temperature, platinum catalyst and PEM-based, dilute aqueous phase systems, which may manifest shortcoming such as internal crossover and, thus, low Faradaic efficiency and catalyst poisoning or degradation that make them less attractive commercially. The moderate to high temperature is sufficient to provide the inorganic or organic salts in a molten form, resulting from a temperature greater than that for supporting aqueous processes but sufficiently low for supporting polymer or plastic based containment structures.

Therefore, referring to FIGS. 5 and 6, the fuel cell 112, in a discharge mode 142, generates an electron flow 210 for powering a load 212. The halogen ($Br_2$) flowing into the containment 190-2 receives electrons 220 from the electrical flow 210 at the electrode 120-2 to form bromide ions 222 transported via the molten salt 202. The bromide ions 222 combine with the hydrogen 224 to form hydrogen bromide and release electrons 226 to provide the voltage potential at the electrode 120-1 supporting the electrical flow 210. As an example of a homogeneous catalyst that may be employed to facilitate the electrode reactions, copper and palladium bromide salts may also be employed dissolved in the molten salt 202. Particular features of the disclosed configuration include the following:

- A thin porous ceramic or polymer separator 130 with supported molten-salt or ionic liquid electrolyte, having as an example the various combinations discussed below in FIG. 7.
- An optional homogeneous catalyst such as $Pd(II)Br_2$—$Cu(II)Br_2$ may be solvated within the molten-salt electrolyte (the so-called "Wacker Catalyst", as is known in the art).
- An absence of Pt-based solid nanoparticle catalysts and, hence, their cost and deactivation via Ostwald ripening or dissolution.
- A two-phase interface (instead of the usual three-phase interface, or TPI), which is easier to control and stabilize via a dual pore structure and appropriate wetting characteristics.
- Diffusion of halide ions such as $Br^-$, $Cl^-$ in the molten-salt or ionic liquid electrolyte 202, rather than of proton (positive ions) in conventional low-temperature hydrogen-halogen URFCs;
- The molten-salt electrolyte is supported on a ceramic separator, e.g., MgO, AlN, SiC, $LiAlO_2$, porous glass, and $ZrO_2$, or polymer separator such as polyvinylidene difluoride (PVDF) and polybenzimidazole (PBI)

Figure 7:
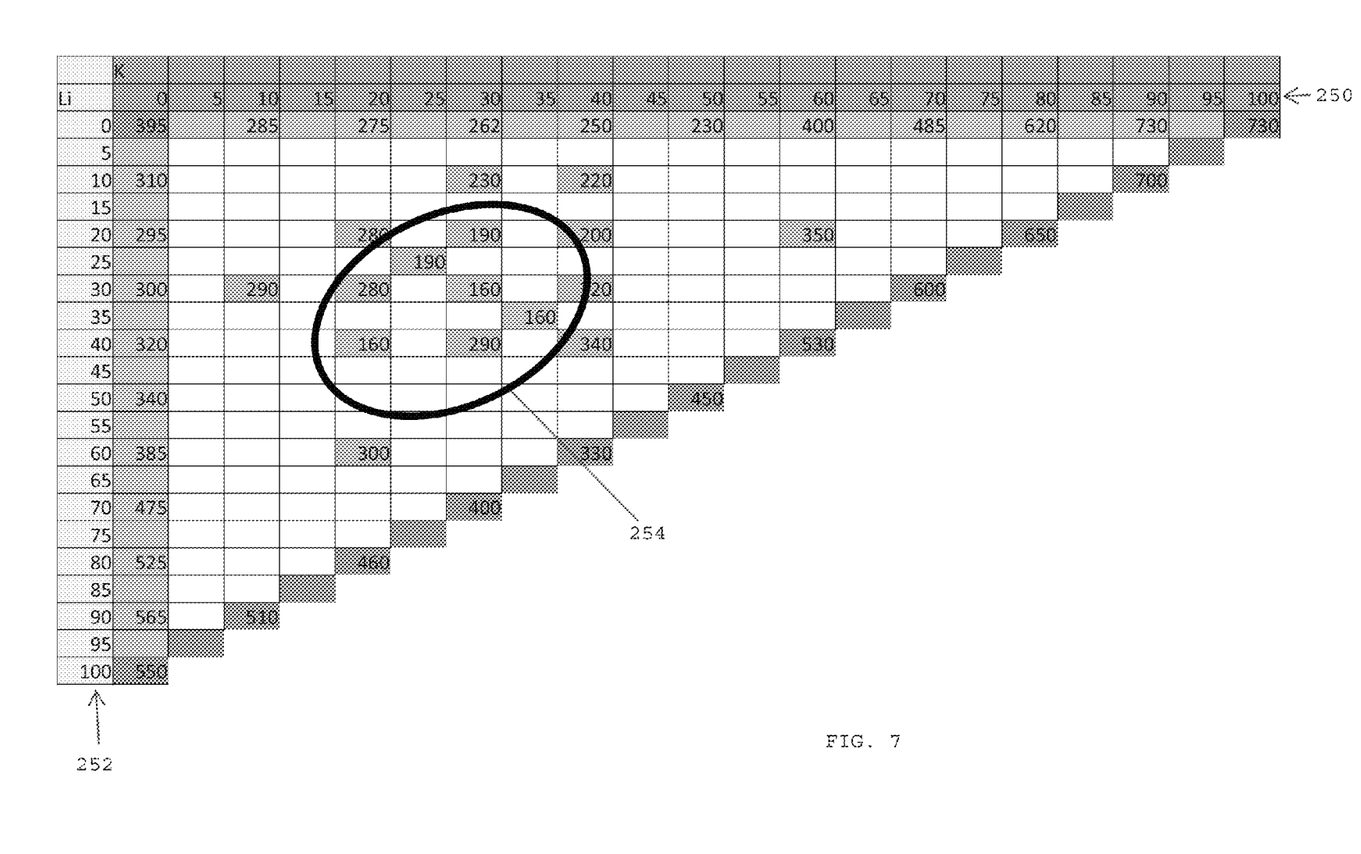
FIG. 7 shows an example of a eutectic mapping of molten salts for use in the hydrogen-bromine fuel cell of FIG. 2.

FIG. 7 shows, as an example, a eutectic mapping of typical halide molten salts for use in the fuel cell of FIG. 2, involving bromides of K, Li, and Zn. It is clear from this that there are many molten-salt compositions possible that allow operation in the moderate to high temperature range (150-400° C.). As further discussed above, in the example configuration, the separator 130 may be defined by a thin (typically, 100-500 μm) ceramic or polymer porous layer with a supported molten-salt electrolyte. The molten salt separator is adapted for negative ion transfer across the separator to the chamber on the opposed side, and in the example arrangement, the negative ions are halogens such as bromide and chloride.

The molten salt electrolyte is comprised of a plurality of salts defining a combination of salts in a ratio based on a melting point, such that the combination of salts has a melting point lower than any of the salts individually. In the configuration shown in FIG. 7, the molten salts include bromides of lithium (Li), potassium (P) and zinc (Zn), and the ratios may range as disclosed in FIG. 7. Referring to FIG. 7, the example molten salt eutectic is characterized by a horizontal axis 250, depicting a percentage of potassium (K), and a vertical axis 252 depicting the percentage of lithium (Li). The remaining quantity is of zinc (Zn), and the resultant melting temperatures at different compositions are shown. An optimal range 254 shows a cluster of lower melting points for the indicated combination percentages. These ranges are beneficial because the containment vessels need only withstand the stated temperature, allowing a wider range of inexpensive and corrosion resistant containment materials, including plastics.

Among their other properties, the use of molten salts as electrolytes allows high temperatures, high liquid-phase conductivities, large electrochemical windows, low viscosity (~1 cP), and an absence of volatility. Thus, the liquidus range of molten salts is particularly large, e.g., the KCl—CuCl (35-65 mol %) eutectic has a M.P. of 150° C., and a B.P. of 1500° C. As a result, molten salt electrolytes are essentially nonvolatile, with MPs that can be readily manipulated via composition (e.g., FIG. 7). In contrast, Nafion®, used in conventional fuel cells, is limited to a temperature <100° C. Further, the conductivity of molten salts is substantially an order of magnitude higher than that of Nafion®. Further, molten salt electrolytes very similar to those proposed here are employed in thermal batteries (e.g., LiCl—KCl, 45-55, MP=352° C.).

The immobilization of the selected molten salt within a thin but strong porous inert matrix in a stable manner is beneficial toward good performance, high efficiency, and a durable life for the URFC. This is affected by both the properties of the molten salt, i.e., density, viscosity, and surface tension, as well as those of the support, namely, pore size and distribution, wetting characteristics, inertness, and mechanical strength. Thus, choice of an appropriate support layer is significant.

As indicated above, selection of the molten salt and optional catalysts may include various ionic liquids capable of facilitating the ionic transfer illustrated above. As is known in the art, molten salts generally implies ionic (e.g., K+Br-) electrolytes with inorganic (metallic) cations, e.g., K+. On the other hand, ionic liquids are generally taken to imply ionic electrolytes (e.g., BuN+Br-) with organic cations, e.g., BuN+. Accordingly, the molten salts may include halides (anions) of alkali metals (cations) such as bromides of Lithium lithium (Li), Potassium potassium (PK), sodium (Na), caesium (Cs), and transition metals such as Zinc zinc (Zn). The molten salts or ionic liquids may also include halides (anions) of tetralkyl ammonium (cations) such as bromides of tetrabutyl ammonium (Bu4N+Br-), tetraethyl ammonium (Et4N+Br-), tetramethyl ammonium (Me4N+Br-), or halides of other common organic cations such as cyclic amines, both aromatic (pyridinium, imidazolium) and saturated (piperidinium, pyrrolidinium), as well as those based on temperature molten salts based on sulfonium [R3S]+ as well as phosphonium [R4P]+.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting, the full scope rather being conveyed by the appended claims.

What is claimed is:

1. An electrochemical device comprising:
a cell including a molten salt separator between a plurality of chambers, each chamber corresponding to a respective side of the molten salt separator;
a fluidic coupling for a first energy component;
a fluidic coupling for a second energy component, the first and second energy components adapted for ionic transfer;
a stable electrode attached to each side of the separator for defining a two-phase electrochemical interface, the stable electrode resistant to chemical degradation from the first or second energy component or from the molten salt separator, the stable electrode suitable for electron transfer with the energy component in the corresponding chamber and
the molten salt separator including a combination of a plurality of molten salts adapted for negative ion transfer, the negative ions further comprising halides, the molten salt separator being a porous ceramic or polymer substrate impregnated with molten salt in a predetermined combination, the combination of salts having a melting point lower than any of the plurality of salts individually the molten salts providing an operating temperature greater than that for supporting aqueous processes and sufficiently low for supporting polymer based containment structures, wherein:
the first energy component is bromine;
the second energy component is hydrogen; and
the molten salt separator is responsive to transfer of negative bromide ions across the separator for providing for providing a potential.

2. The device of claim 1 further comprising a homogeneous catalyst, comprising ionic species dissolved within the molten salt in the molten salt separator.

3. The device of claim 1 wherein the molten salt separator is adapted for negative ion transfer across the molten salt separator to the chamber on the opposed side.

4. The device of claim 1 wherein the molten salts include halides (anions) of alkali metals (cations) selected from the group consisting of bromides of lithium (Li), potassium (K), sodium (Na), caesium (Cs), and transition metals such as zinc (Zn).

5. The device of claim 1 wherein the molten salts include halides (anions) of tetralkyl ammonium (cations) selected from the group consisting of bromides of tetrabutyl ammonium ($Bu_4N^+Br^-$ tetraethyl ammonium ($Et_4N^+Br^-$ tetramethyl ammonium ($Me_4N^+B^-$ halides of organic cations including cyclic amines, aromatic (pyridinium, imidazolium) and saturated (piperidinium, pyrrolidinium), and those based on temperature molten salts based on sulfonium $[R_3S]^+$ and phosphonium $[R_4P]^+$.

6. The device of claim 1 wherein electrochemical device comprises a fuel cell and the plurality of chambers comprise containment structures including an anode chamber and a cathode chamber, the molten salt separator defining an ionic barrier between the anode chamber and cathode chamber for facilitating a voltage potential between electrodes on the opposed sides of the separator.

7. The device of claim 1 wherein:
the first energy component includes chlorine;
the second energy component includes hydrogen; and
the molten salt separator is responsive to transfer of negative chloride ions across the separator for providing a voltage potential.

8. The device of claim 1 wherein the electrodes are responsive to a voltage potential for reversing the ionic transfer and restoring electrical generation properties of the first and second energy components.

* * * * *